United States Patent
Agnew et al.

(10) Patent No.: US 9,692,848 B2
(45) Date of Patent: Jun. 27, 2017

(54) PREEMPTIVE LOADING OF PROTECTED DATA FOR STREAMING MOBILE DEVICES

(71) Applicant: ZixCorp Systems, Inc., Dallas, TX (US)

(72) Inventors: Deryk Shane Agnew, Plano, TX (US); Alton Ray Fowler, Richardson, TX (US)

(73) Assignee: ZixCorp Systems, Inc., Dallas, TX (US)

(*) Notice: Subject to any disclaimer, the term of this patent is extended or adjusted under 35 U.S.C. 154(b) by 323 days.

(21) Appl. No.: 14/495,227

(22) Filed: Sep. 24, 2014

(65) Prior Publication Data
US 2016/0088115 A1    Mar. 24, 2016

(51) Int. Cl.
*H04L 29/08* (2006.01)
*H04L 12/58* (2006.01)

(52) U.S. Cl.
CPC ........ *H04L 67/2842* (2013.01); *H04L 51/066* (2013.01); *H04L 51/26* (2013.01); *H04L 67/306* (2013.01)

(58) Field of Classification Search
CPC ... H04L 51/066; H04L 51/26; H04L 67/2842; H04L 67/306
See application file for complete search history.

(56) References Cited

U.S. PATENT DOCUMENTS

| | | | |
|---|---|---|---|
| 7,496,762 B1 | 2/2009 | Boydstun et al. | |
| 8,117,269 B2 | 2/2012 | Sylthe et al. | |
| 8,145,766 B2 | 3/2012 | Dumitru et al. | |
| 8,453,051 B1 | 5/2013 | Weiss et al. | |
| 2004/0139396 A1 | 7/2004 | Gelerneter et al. | |
| 2005/0110654 A1* | 5/2005 | Kitano ................ | G01C 21/26 340/13.24 |
| 2006/0277271 A1 | 12/2006 | Morse et al. | |
| 2007/0263007 A1 | 11/2007 | Robotham et al. | |
| 2009/0006423 A1 | 1/2009 | Crawford | |
| 2009/0043865 A1 | 2/2009 | Dumitru et al. | |
| 2009/0249440 A1 | 10/2009 | Platt et al. | |
| 2010/0306528 A1 | 12/2010 | Andress et al. | |
| 2011/0107437 A1 | 5/2011 | Goyal et al. | |
| 2011/0145564 A1 | 6/2011 | Moshir et al. | |

(Continued)

FOREIGN PATENT DOCUMENTS

EP    1 107 539    6/2001

OTHER PUBLICATIONS

Sudhakar et al., "QoE Improvement in Telecom Networks Using Dynamic Preload based Content Caching", IEEE, Jan. 2014, 6 pages.*

(Continued)

*Primary Examiner* — Brian J Gillis
*Assistant Examiner* — Amy Ling
(74) *Attorney, Agent, or Firm* — Baker Botts L.L.P.

(57) ABSTRACT

According to some embodiments, a proxy server populates a proxy server cache with first user content and sends the first user content to a secure client application executing on a user's mobile device. The proxy server determines a usage pattern based on a portion of the first user content consumed by the secure client application, prioritizes unrequested user content according to the usage pattern, and populates the proxy server cache with at least a portion of the unrequested user content based on priority.

28 Claims, 7 Drawing Sheets

(56) References Cited

U.S. PATENT DOCUMENTS

| | | |
|---|---|---|
| 2011/0283198 A1 | 11/2011 | Rybak et al. |
| 2012/0084184 A1 | 4/2012 | Raleigh et al. |
| 2012/0131685 A1 | 5/2012 | Broch et al. |
| 2012/0179787 A1 | 7/2012 | Walsh et al. |
| 2012/0254944 A1 | 10/2012 | Kamat et al. |
| 2012/0311659 A1 | 12/2012 | Narain et al. |
| 2013/0055368 A1* | 2/2013 | Bauckman .............. H04L 51/24 726/7 |
| 2014/0095591 A1 | 4/2014 | Chan et al. |

OTHER PUBLICATIONS

N. P. Johnson, U.S. Appl. No. 13/551,972, Response to Final Office Action filed Jan. 15, 2016.

N. P. Johnson, U.S. Appl. No. 13/551,972, Applicant Initiated Interview Summary dated Jan. 21, 2016.

N. P. Johnson, U.S. Appl. No. 13/551,972, Advisory Action dated Feb. 19, 2016.

N. P. Johnson, U.S. Appl. No. 13/551,972, Request for Continued Examination and Amendment filed Mar. 17, 2016.

U.S. Appl. No. 13/551,972, filed Jul. 18, 2012, inventor Nigel Paul Johnson, et al. entitled "Secure Data Access for Multi-Purpose Mobile Devices" 52 pages, Jul. 18, 2012.

PCT Notification of Transmittal of the International Search Report and the Written Opinion of the International Searching Authority, or the Declaration, 11 pages, Jan. 9, 2014.

USPTO Non-Final Office Action for U.S. Appl. No. 13/551,972, inventor Nigel Paul Johnson et al., 30 pages, Jun. 20, 2014.

Response to Non-Final Office Action for U.S. Appl. No. 13/551,972, inventor Nigel Paul Johnson, et al., 26 pages, Sep. 22, 2014.

PCT Notification of Transmittal of the International Search Report and The Written Opinion of the International Searching Authority, or the Declaration, International Application No. PCT/US2015/051394; 12 pages, Dec. 14, 2015.

U.S. Patent Office Action U.S. Appl. No. 13/551,972, Nigel Paul Johnson, Response to Non-Final Office Action, Sep. 16, 2015.

U.S. Patent Office Action U.S. Appl. No. 13/551,972, Nigel Paul Johnson, Final Office Action, Nov. 18, 2015.

U.S. Patent Office U.S. Appl. No. 13/551,972; First Named Inventor: Nigel Paul Johnson; Non-Final Office Action, 28 pages, Jun. 17, 2015.

N. P. Johnson, U.S. Appl. No. 13/551,972, Final Office Action dated Jan. 15, 2015.

N. P. Johnson, U.S. Appl. No. 13/551,972, Response to Final Office Action dated Apr. 15, 2015.

* cited by examiner

PREEMPTIVE LOADING OF PROTECTED DATA FOR STREAMING MOBILE DEVICES

FIELD OF THE INVENTION

The invention relates generally to data security and more particularly to preemptive loading of protected data for streaming mobile devices.

BACKGROUND

Mobile devices have become one of the basics for providing convenient access to email and other data. Mobile devices may be used to access personal data as well as business data. While some people carry several mobile devices (e.g., one for personal purposes and another for business purposes), it is becoming more and more common for people to consolidate personal data and business data onto one multi-purpose mobile device. Thus, the same mobile device used to store family photographs and personal apps may also be used to access business email, business contacts, business calendars, and other business-related data.

In some cases, each user (rather than the business) chooses his or her particular mobile device from a wide array of devices available on the market. The user will typically choose the device based on the brand, model, service provider, or other criteria that best meets his or her personal purposes. A device chosen based on the user's personal purposes, however, may fail to provide an adequate level of security to business-related data. Thus, the business-related data may be at risk if the device becomes lost or stolen.

SUMMARY

According to some embodiments, a proxy server populates a proxy server cache with first user content and sends the first user content to a secure client application executing on a user's mobile device. The proxy server determines a usage pattern based on a portion of the first user content consumed by the secure client application, prioritizes unrequested user content according to the usage pattern, and populates the proxy server cache with at least a portion of the unrequested user content based on priority.

Some embodiments of the disclosure may provide one or more technical advantages. A technical advantage of certain embodiments may be that a proxy server streams user content to a secure client application running on a user's mobile device. The secure client application may provide a secure environment for the user content. A technical advantage of certain embodiments may be that the proxy server anticipates user content that a user is likely to request and caches the user content in advance. Caching the user content in advance may allow for a responsive application where the user perceives the user content as being delivered quickly. A technical advantage of certain embodiments may be that unrequested user content may be reprioritized based on changes in the user's usage pattern. Thus, user content that is likely to be requested next has high priority in the cache.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
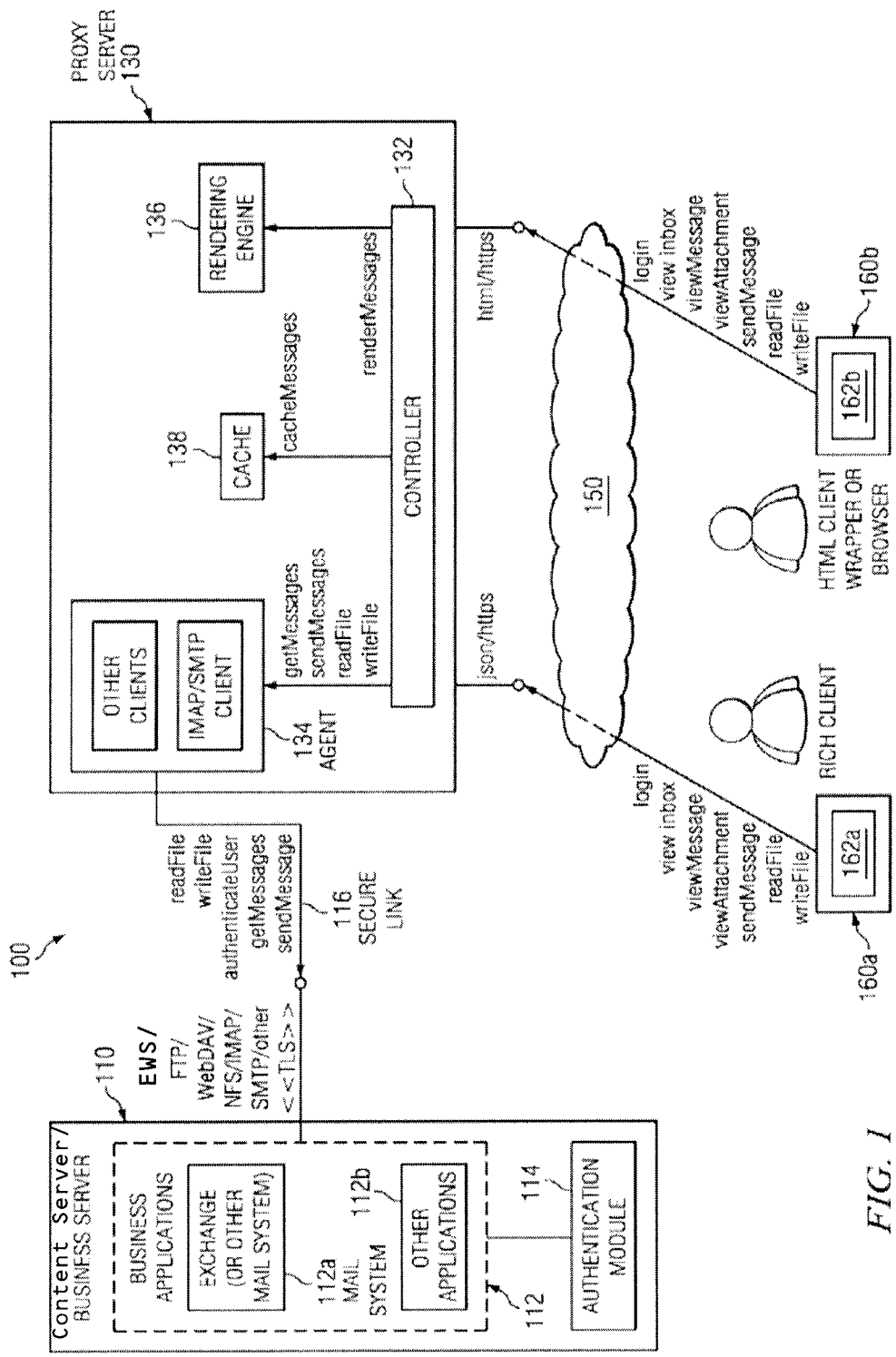
FIG. 1 illustrates an example of a system for securing data access for multi-purpose mobile devices.

As described above, a user may use a mobile device for personal purposes, such as storing family photographs, and for business purposes, such as accessing business email, business contacts, and business calendars. Known mobile devices commonly store raw data in local memory and process the raw data using a data-specific application running on the mobile device. Examples of data-specific applications include Microsoft Outlook™ for processing raw .msg data, Microsoft Word™ for processing raw .doc data, Adobe Acrobat™ for processing raw .pdf data, etc. Unfortunately, the raw data stored locally on the mobile device may be vulnerable to security breaches.

Certain embodiments of the present disclosure allow for increasing data security by limiting the amount of protected data that is kept locally at the user's device. In some embodiments, the protected data may include user content related to the user's business, such as the user's business email, business contacts, and business calendars. Portions of the protected data that the user is currently using or likely to use in the near term may be streamed to a secure client application running on the user's mobile device. For example, a proxy server may render raw data remotely and then stream the rendered form of the data to the secure client application. The secure client application may then display the rendered data to the user.

Portions of the protected data that the user is not currently using or likely to use in the near term may be maintained remotely at a secure server. Thus, at any given time, the secure client application running on the user's mobile device may store no more than the limited amount of protected data that the user is currently using or likely to use in the near term. The secure client application may provide protections to that data, such as deleting the data after a certain amount of time, requiring the user to enter a password to view the data, and prohibiting copying the data outside of the secure client application. Thus, if the user's mobile device becomes lost or stolen, the secure client application may reduce the likelihood of an unauthorized person accessing the protected data.

Certain embodiments provide a user experience (e.g., a speed and visual appearance) comparable to that provided when user content is stored locally and processed by a data-specific application. For example, to facilitate fast, secure streaming of data to the mobile device, the user content may be preemptively loaded in a proxy server cache. Before the user requests user content, the proxy server may anticipate the user content to be consumed next and may populate that user content in the proxy server cache for delivery to the secure client application. In some embodiments, the proxy server monitors user content consumed by the user and determines a usage pattern. The proxy server uses the usage pattern to preemptively load the proxy server cache with user content that the user is more likely to consume soon. Thus, the proxy server proactively prioritizes and/or optimizes the available user content to allow faster streaming to the secure client application running on the user's mobile device.

In some embodiments, the secure client application running on the user's mobile device communicates with a centralized proxy server. The proxy server retrieves user content from a content server on behalf of the secure client application and provides the secure client application with access to a synchronized cache of the user content. The proxy server cache is used for user content consumption by the secure client application. In some embodiments, the proxy server begins populating an initial, partial cache upon the secure client application establishing a session to the proxy server and prior to the user actually interacting with the secure client application. Thus, the proxy server may begin delivering user content to the secure client application in advance so that by the time the user starts actually interacting with the secure client application, the secure client application already has some user content ready to present to the user.

As the user begins to interact with the secure client application, additional user content is populated to the proxy server cache using a prioritization algorithm. The prioritization algorithm anticipates and prioritizes the portions of the user content that are most likely to be accessed by the user. Preference may be given to domains of data that are more likely to be accessed based on the user's actions. As examples, domains of data may include email messages, calendar appointments, notes, and contact information. The proxy server may initially cache user content belonging to a frequently used domain (such as email) or a recently used domain (such as the domain accessed during the user's most recent session). If the user subsequently requests user content from a new domain, the proxy server may cache the requested user content from the new domain and may proactively cache unrequested user content from the new domain.

While retrieving user content on behalf of the user, the proxy server may use a "less to more strategy." The "less to more strategy" assumes that users generally want to expand visibility to user content transitioning from less detailed (e.g., a list of emails) to more detailed (e.g., the body of an email) and, if applicable, to an even more detailed (e.g., an attachment to the email). As the user begins to drill down to more detail, the proxy server cache drills down proactively. For example, if the user has been scrolling through a list of emails, the proxy server may proactively cache the next emails in the list as well as the body of certain emails likely to be consumed (such as the most recent emails or emails related to a recently viewed email). If the user begins to drill down to more detail by opening an email and viewing the body, the proxy server may proactively cache attachments to that email before the user requests the attachments.

In conjunction with drilling down according to the "less to more strategy," specific additional data conversions may also be applied to allow for rapidly streaming the user content to the client application. By doing this, the proxy server's cache may always be one step ahead of the user, leading to a richer, more responsive experience. As the user transitions from one domain to another, priority may be given to the new domain. Thus, prioritization may be given to what the user is about to consume over what the user has already consumed. To address scenarios where the user comes back to re-consume previously consumed user content, after user content has been consumed it may be maintained in the proxy server cache but given lesser priority than user content that has not yet been consumed.

As the proxy server's cache is established, new data may become available for consumption. For example, the user may directly create the new user content or new user content may become available due to an external factor (such as a new email being received). In some embodiments, as this occurs the proxy server cache is updated dynamically for the portions of data that changed thereby giving preference to new user content over older user content.

In some embodiments, the amount of time that the content is maintained on the proxy server cache is determined based on the user's usage patterns and/or proxy server performance metrics, such as server load, availability of server memory, data utilization, time of availability, and/or other metrics indicative of how much data the proxy server can maintain at a given time.

Embodiments of the present disclosure are further described with respect to FIGS. 1-5 of the drawings, like numerals being used for like and corresponding parts of the various drawings.

FIG. 1 illustrates an example of a system 100 for securing data access for mobile devices. In the illustrated example, system 100 includes a content server 110, a proxy server 130, a network 150, and a plurality of devices 160 coupled as illustrated. In some embodiments, system 100 facilitates securing user content and other data communicated between a content server 110 and a device 160. As an example, system 100 may facilitate securing an email communicated from content server 110 to device 160. In order to secure the email, content server 110 may communicate the email in raw format to a proxy server 130. Proxy server 130 may render the email into a displayable format, such as a bitmap image, and communicate the rendered email to a secure client application of device 160. The secure client application of device 160 may then display the email to a user.

Content server 110 may refer to a server that maintains user content that is to be protected. In some embodiments, content server 110 may be a business server that maintains user content belonging to a party with whom the user of device 160 has a business relationship, such as the user's employer. Examples of user content include various types of raw data files, such as emails (including headers, body, and attachments), word processing files, spreadsheets, presentations, drawings, photographs, calendars, contacts, and so on. Content server 110 may include any suitable applications 112 to facilitate accessing and storing the user content. For example, content server 110 may include a mail system 112a to facilitate accessing and storing emails, calendars, and/or contacts. In some embodiments, mail system 112a may be implemented using a Microsoft Exchange™ server. Content server 110 may include one or more other applications 112b to facilitate accessing and storing other user content, such as file repository for word processing documents, spreadsheets, photographs, and so on.

Content server 110 may comprise an authentication module 114 that facilitates securing access to the user content. For example, authentication module 114 may ensure that a user has been successfully authenticated before permitting user content to be accessed on behalf of the user. In some embodiments, the user enters login credentials into device 160, device 160 communicates the login credentials to proxy server 130, and proxy server 130 communicates the login credentials to content server 110. Content server 110 processes the login credentials in authentication module 114. Authentication module 114 may determine that the user passes authentication if the login credentials match a user profile that it associates with the user. Once authentication passes, proxy server 130 may be authorized to access user content on behalf of device 160 and to communicate the user content to device 160 for presentation to the user.

In some embodiments, authentication module 114 may be configured to allow proxy server 130 to pre-fetch user content on behalf of the user before the user completes login and passes authentication for the current session. As an example, if proxy server 130 has provided correct login credentials to content server 110 during a previous and/or recent session, content server 110 may allow proxy server 130 to access user content prior to the current session passing authentication. The pre-fetched user content may be populated to an initial cache of proxy server 130 for fast delivery to the user. Optionally, the pre-fetched user content may be tagged to indicate to proxy server 130 and/or the secure client application running on device 160 not to present the user content to the user until the user passes authentication for the current session.

Content server 110 and proxy server 130 may communicate over a secure link 116. Secure link 116 may provide a communication path between content server 110 and proxy server 130 over a direct session (e.g., if content server 110 and proxy server 130 are located at the same site) or an indirect session (e.g., via one or more networks if content server and proxy server are located remotely from one another). Content server 110 may optionally require proxy server 130 to pass a proxy server authentication procedure in order to establish secure link 116. In some embodiments, secure link 116 may be secured according to the Transport Layer Security (TLS) protocol.

In some embodiments, secure link 116 may be used to communicate email-related messaging between proxy server 130 and mail system 112a of content server 110. Examples of email-related messaging may include getMessage and sendMessage commands. Any suitable protocol or combination of protocols may be used to communicate the email-related messaging. As an example, proxy server 130 may use Internet Message Access Protocol (IMAP) to request an email from mail system 112a (pull mode), mail system 112a may use ActiveSync protocol to automatically send incoming emails to proxy server 130 in real-time (push mode), and/or mail server 112 may communicate the email to proxy server 130 according to Simple Mail Transfer Protocol (SMTP). As another example, Exchange Web Services (EWS) may be used to communicate email-related messaging over secure link 116.

The IMAP, ActiveSync, SMTP, and EWS standards are traditionally used to send entire copies of numerous emails, calendar entries, and contacts to be stored locally on device 160. Storing the data locally on device 160 allows for a fast response time to the user's request to view the data. However, storing data locally presents security risks. To address these risks, certain embodiments of the present disclosure use these standards to send copies of the data to be temporarily stored on proxy server 130, rather than to device 160 long-term. Proxy server 130 may then provide increased security by controlling the format and nature of the data that gets sent to device 160. As discussed below, proxy server 130 may communicate the data in such a way that the user experience is comparable to having an entire copy of the email stored locally on device 160 (similar look and feel, with a fast response time to user requests).

In some embodiments, agent 134 may communicate commands to a file repository of content server 110 via secure link 116. Examples of commands include readFile and/or writeFile. Such commands may be communicated according to FTP, NFS, webDAV, and/or other suitable protocols.

As used herein, proxy server 130 may refer to hardware and/or software positioned between content server 110 and device 160 and configured to manage device 160's access to user content maintained by content server 110. In some embodiments, proxy server 130 may be implemented using a cloud-computing architecture. For example, a business may implement a cloud-based datacenter that includes content server 110 and proxy server 130. As another example, a third party security provider may host proxy server 130 remotely from content server 110 in order to provide security on behalf of the business. In certain alternative embodiments, the proxy server 130 may comprise on-site hardware and/or software that may be directly connected to or installed with content server 110.

Proxy server 130 may comprise one or more interfaces for communicating with devices 160. For example, a first interface may be configured for devices 160 that use a rich client to communicate with proxy server 130. A second interface may be configured for devices 160 that use a thin client to communicate with proxy server 130. The first interface may use a lightweight protocol suited to webservices applications and/or object-oriented design. In some embodiments, the lightweight protocol may use a text-representative format, such as JavaScript Object Notation (JSON) protocol or Extensible Markup Language (XML). The second interface may use HTML or other suitable protocol.

Components of proxy server 130 may include one or more controller(s) 132, agent(s) 134, rendering engine(s) 136, and/or cache(s) 138. Controller 132 may receive a request from device 160, determine tasks to be completed in order to respond to the request, allocate the tasks to one or more components of proxy server 130, and send a response to device 160. For example, if device 160 requests access to user content, controller 132 may allocate the following tasks: agent 134 facilitates authenticating the user with content server 110 and retrieves the user content in a raw format, rendering engine 136 renders the user content by converting it from the raw format into a rendered format (e.g., a text-representative format and/or a bitmap image) and/or dividing it into a plurality of rendered portions as needed depending on the amount of data, controller 132 communicates a first rendered portion to device 160, and cache 138 caches the remaining rendered portions so that controller 132 may retrieve and communicate each of the remaining rendered portions to device 160 as needed such that device 160 proactively receives user content that is likely to be consumed so that the user experiences minimal delays when consuming user content. In some embodiments, proxy server cache 138 is stored in memory without persisting any user content to disk.

Agent 134 may facilitate authenticating device 160 by forwarding login credentials submitted by the user to content server 110. Content server 110 performs authentication and sends the authentication result (pass or fail) to proxy server 130 via agent 134. Thus, in certain embodiments, content server 110 performs authentication as if the user was logging directly into his or her account with content server 110, and proxy server 130 uses the authentication result provided by content server 110. Proxy server 130 may determine to allow or reject subsequent requests from the user based on the authentication result, without having to perform a separate authentication between the user and proxy server 130.

In some embodiments, agent 134 comprises a Mail User Agent configured to act on behalf of the user of device 160 by accessing and managing emails that mail system 112a associates with the user. Agent 134 may communicate with mail system 112a of content server 110 according to any suitable protocol, such as Internet Message Access Protocol (IMAP), Exchange ActiveSync (EAS), Outlook Web Access (OWA), Exchange Web Services (EWS), Post Office Protocol (POP), Simple Mail Transfer Protocol (SMTP), and/or any other suitable protocols. Agent 134 may receive emails in a raw format, such as Multipurpose Internet Mail Extensions (MIME). The emails may include email headers (To, From, CC, BCC, Subject, Date, Time, etc.), the body of the email (text, graphics, etc.), and any attached files (word processing files, spreadsheets, presentations, photographs, etc.). In some embodiments, agent 134 may be configured to retrieve other types of data (in addition to or instead of email messages and attachments) according to any suitable data transfer protocol, such as File Transfer Protocol (FTP), webDAV, or Network File System (NFS).

Rendering engine 132 renders the raw data received from content server 110 via agent 134. In some embodiments, rendering may comprise dividing data into portions, converting data from a raw format to a displayable format, or both. As an example, rendering engine 136 of proxy server 130 may provide the MIME messages in a format selected for fast and secure delivery to device 160. In some embodiments, rendering engine 136 may provide some or all of the email headers in a text-representative format, such as JSON or XML format. The text-representative email headers may be communicated to device 160 as preview information to indicate the emails available in the user's mailbox. In some embodiments, rendering engine 136 may provide the email headers, the body of the email, and/or the attachments as rendered data, such as JSON text (e.g., for short text files) and/or bitmap images (e.g., for longer text files or non-text files). The rendered data may be communicated to device 160 to be displayed to the user. Examples of bitmap formats include BMP, DIB, ILBM, PBM, XBM, WBMP, JPEG, TIFF, PNG, GIF, and so on. As discussed with respect to FIG. 2 below, rendering engine 136 may render the raw email into a plurality of rendered portions so that each portion may be communicated to device 160 based on priority.

Cache 138 may store user content associated with a user within proxy server 130 to allow for faster delivery to the user. As an example, proxy server 130 may optionally include a first cache 138 that stores raw format data (e.g., MIME emails) that has been retrieved from content server 110 before the user requests to view the data. Proxy server 130 may optionally include a second cache 138 to cache rendered portions of the data. That is, the raw data may be rendered into a plurality of rendered portions (e.g., as bitmap images) and cached in advance, and each rendered portion may be retrieved from cache 138 and communicated to device 160 such that the time spent rendering the data occurs before the user needs the data. Cached data may optionally be encrypted for increased security.

In some embodiments, cache 138 provides increased security by deleting data associated with a particular user upon termination of the authenticated session corresponding to the user. If the user establishes a subsequent authentication session, proxy server 130 may once again retrieve the user's data from content server 110. In other embodiments, cache 138 may maintain data relatively long-term. Accordingly, user content may be cached by proxy server 130 during the times that the secure client application is connected to proxy server 130, during the times that the secure client application is not connected to proxy server 130, or both. For example, content server 110 may periodically push data to proxy server 130 (or proxy server 130 may pull data from content server 110). Caching the data in advance may allow proxy server 130 to respond quickly to data retrieval requests that it receives from secure client application 162 of device 160.

By performing the above rendering and caching functions at proxy server 130, memory and processing resources of device 160 may be conserved. For example, device 160 may not be required to store large files, to store files long term, or to install/run the data-specific application. In addition, performing the rendering functions at proxy server 130 may allow for support of a wide array of devices 160 because devices 160 need not be required to install any specialized software, such as the data-specific application, in order to view the data.

Use of proxy server 130 may provide increased security to user content. Proxy server 130 may send device 160 only as much data as is needed to support the current and anticipated activities of the user. Any other data may be kept at proxy server 130 where it can be better protected. To further protect the data, the data may be deleted from device 160 and/or the user may be required to re-authenticate upon a determination that a completion event occurred, such as expiry of a timer or the user logging out of the authenticated session, navigating to a different message, or using a personal app on device 160. Depending on the circumstances and the desired level of security, re-authentication may comprise either a) performing the authentication procedure between device 160 and content server 110 again, b) performing a short authentication procedure between device 160 and proxy server 130 (e.g., entering a PIN), and/or c) performing a short authentication procedure locally at device 160 (e.g., entering a PIN to be verified by the secure client application). Proxy server 130 may be configured to enforce any other security policies, such as policies for disabling a device 160 or for performing lexicon-based filtering. The lexicon-based filtering may be configured to prevent emails containing certain keywords from being delivered to the user via device 160. Examples of such keywords may include "confidential," "privileged," "proprietary," "secret," or customized keywords that the business designates as requiring increased security, such as "Project X."

Turning to device 160, device 160 may include any suitable combination of hardware and/or software, such as a computing system comprising one or more interfaces, logic, and/or one or more memories, which are described in more detail with respect to FIG. 3 below. In some embodiments, device 160 may be a multi-purpose mobile device configured to support a user's business purposes and personal purposes, such as a telephone (e.g., cellular, mobile, or smart), a personal digital assistant, a gaming device, a thin client, a tablet computer, or a laptop computer. In some embodiments, a particular brand/model of device 160 may be chosen by the user to meet the user's personal purposes. Device 160 may communicate with proxy server 130 via a wired or wireless network 150 in order to retrieve user content, such as preview information (e.g., JSON formatted or other text-representative email headers, or other preview information) and rendered data (e.g., JSON formatted or other text-representative email body, bitmap formatted email attachments, or other rendered data) to present to the user via a display.

Device 160 may include a secure client application 162 configured to generate messages to send to proxy server 130 and to process messages received from proxy server 130. As an example, secure client application 162 may generate authentication request messages to send the user's login credentials to proxy server 130. As another example, secure client application 162 may, in response to input from the user, generate requests for proxy server 130 to send user content. Secure client application 162 may receive the user content from proxy server 130 (e.g., in the form of preview information or rendered data) and display the user content to the user. Secure client application 162 may also execute instructions received from proxy server 130, such as instructions to prompt the user to supply login credentials or instructions to delete user content from device 160.

Secure client application 162 may comprise any suitable application, such as a Rich Client or a thin client (e.g. an HTML Client, an HTML Client Wrapper, and/or a Browser). As shown in FIG. 1, secure client application 162a illustrates a Rich Client capable of interacting with proxy server 130 using JSON/HTTPS, SOAP, or other suitable protocol. Secure client application 162b illustrates a thin client. As an example, thin client 162b may comprise an HTML Client, an HTML Client Wrapper, or a Browser that interacts with proxy server 130 via HTML/HTTPS and/or other suitable protocol. Proxy server 130 may support both rich and thin client types in order to facilitate a "bring your own device" approach in which each user selects a device from a number of options. If the selected device does not support a rich client, it may receive secure data from the proxy server using a thin client.

Rich Client 162a may be a native device application that presents a login screen, mail boxes, and emails to the user. Rich Client 162a may be characterized by good performance and a high quality user experience. Rich Client 162a may provide a generic graphical user interface (GUI) comprising the email context, such as menu options (forward, reply, save), field names ("To," "From," "Subject"), and other non-message specific context. An object-oriented webservices interface may be used to provide the message-specific information to populate the message-specific fields of the GUI (e.g., that the subject is "hello" or the message date is "January 1"). For example, proxy server 130 may communicate message-specific information, such as the metadata and text portions of an email, in JSON format sent over HTTPS. Proxy server 130 may choose to communicate email attachments and non-text portions of the email in bitmap format or raw data format depending on the capabilities of device 160 or the policies employed by the system.

Although the preceding example describes Rich Client 162a as displaying rendered data, in certain alternative embodiments, Rich Client 162a may include data-specific code or viewers that execute securely within Rich Client 162a to display data received in raw form. For security reasons, the data-specific code that executes within Rich Client 162a may be distinct from data-specific applications of device 160 that are located outside of Rich Client 162a. In such embodiments, additional security may be provided by controlling the amount of raw data that proxy server 130 delivers to Rich Client 162a at a given time. As an example, proxy server 130 may cache an email in MIME format and make portions of the MIME data available to Rich Client 162a as needed to maintain sufficient security and/or user-responsiveness. The portions may correspond to a number of bits, a number of pages, or other suitable division of data. Steps for sending portions of raw data may be analogous to those for sending rendered portions of data, as described with respect to FIG. 2 below.

As discussed above, examples of thin client 162b include an HTML Client, an HTML Client Wrapper, and a browser. An HTML Client may be a web-based version of client application 162 that displays data similarly to the Rich Client (e.g., JSON formatted email text and bitmap formatted attachments). An HTML Client Wrapper may comprise a thin wrapper application around a native device web module that displays the HTML Client. A browser may comprise a native device browser that can be used to display the HTML Client for devices that are not configured with a Rich Client or an HTML Client Wrapper. Use of thin client 162b may allow for proxy server 130 to support a wide array of device types, including device types for which a Rich Client application is not yet available. In some embodiments, functionality for aesthetic presentation of data may be provided by proxy server 130, for example, if device 160's secure client application 162 does not support such capabilities. As an example, the thin client may receive a generic GUI via HTML populated with message-specific data.

In certain embodiments, secure client application 162 comprises synchronous communication on multiple threads, asynchronous communication, or a combination of both. Secure client application 162 may be based on any suitable protocol, such as Asynchronous JavaScript and XML (AJAX), Simple Object Access Protocol (SOAP), WebSockets, raw sockets, or other synchronous or asynchronous protocol. The use of asynchronous or multi-threaded synchronous communication may allow secure client application 162 to obtain data from proxy server 130 in the background before the user requests the data. For example, secure client application 162 may receive the next page of a document that the user is scrolling through before the user gets to the end of the current page. As another example, thin client 162b may receive a generic GUI from proxy server 130 in advance so that by the time the user selects a message, any data that remains to be received is message-specific.

In certain embodiments, secure client application 162 may provide a partition between user content and personal data. For example, user content may be inaccessible outside of secure client application 162 and/or personal data may be inaccessible within secure client application 162. Partitioning may prevent user content from being copied or stored into low security portions of device 160. In addition, partitioning may eliminate the need for the business to monitor or restrict how the user uses device 160 outside of secure client application 162. Thus, the user may be free to download personal apps or other personal data onto the device. Moreover, the amount of device resources used by secure client application 162 may be minimal. For example, proxy server 130 may provide only the data that the user is actively using or likely to use, such as one or two emails and their attachments, and secure client application 162 may delete any data that the user is not actively using or likely to use (as long as the user is authenticated, the deleted data may be re-sent by proxy server 130 if the user needs it again in the future). Accordingly substantial memory and processing power may be available to meet the user's personal purposes. In certain embodiments, the partitioning may be performed dynamically based on the resources that secure client application 162 needs to support its current operations and its anticipated next operations. Thus, it may be unnecessary to permanently reserve resources to secure client application 162, and the resources may be freed up for use by other applications when client application 162 does not need to use them.

Components of the systems and apparatuses disclosed may be coupled by any suitable communication network, such as network 150. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although certain components of system 100 have been described in the context of securing email, analogous components may be used to secure other types of data, such as other files associated with a virtual workspace (e.g., text or word processing files, presentations, spreadsheets, photographs, drawings, calendars, contacts, and so on). In addition, components and protocols shown in FIG. 1 have been provided for purposes of example and illustration. More, fewer, or other protocols and components may be used without departing from the scope of the invention.

Figure 2:
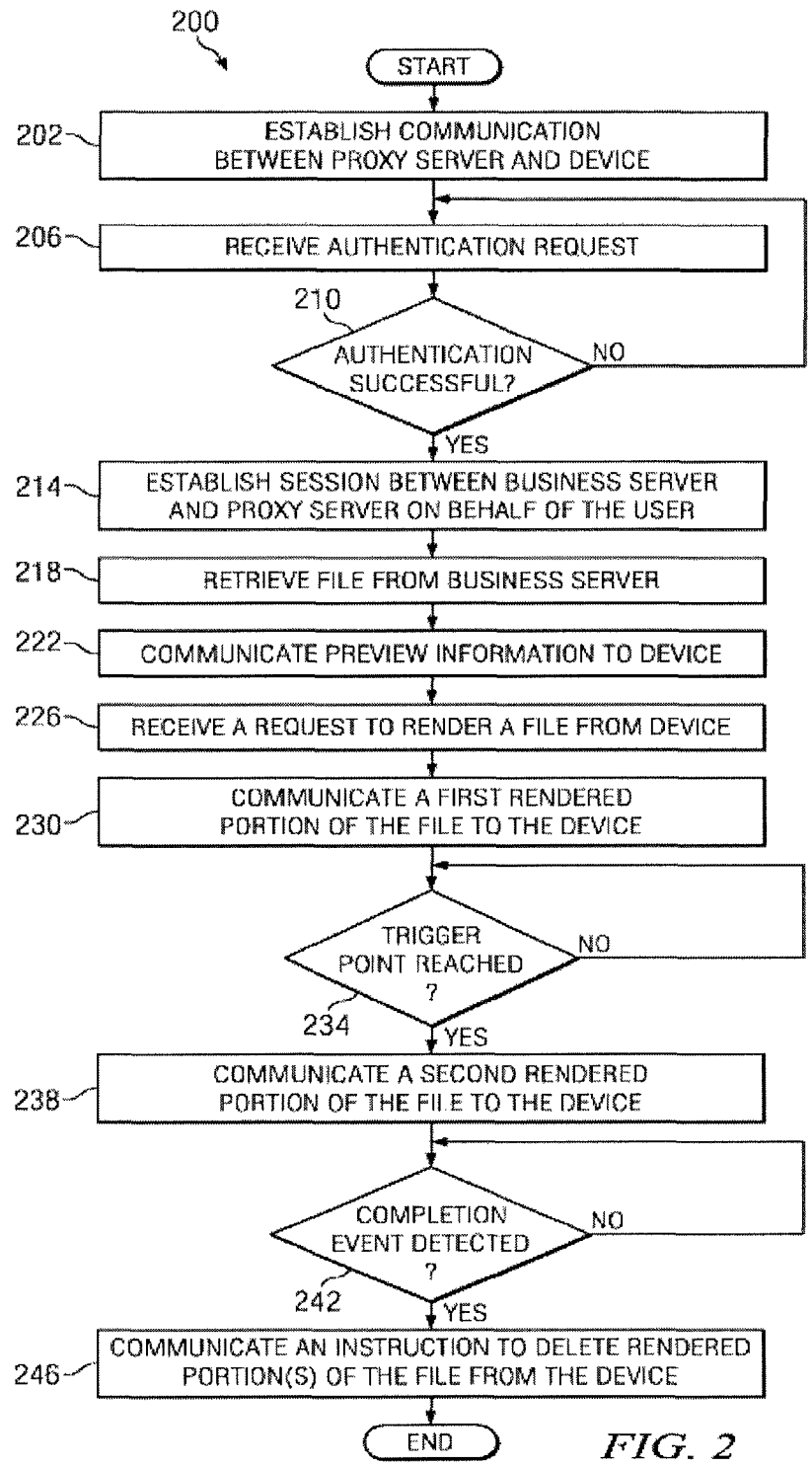
FIG. 2 illustrates an example of a method for securing data access for multi-purpose mobile devices.

FIG. 2 illustrates an example of a method 200 for securing data access for a multi-purpose mobile device. For purposes of example and illustration, method 200 describes steps for securing access to email data. Analogous steps may be used to secure other types of data, such as other files associated with a virtual workspace (e.g., text or word processing files, presentations, spreadsheets, photographs, drawings, calendars, contacts, and so on).

The method begins at step 202 by establishing a communication path between proxy server 130 and device 160. Communication may be established through any suitable number or arrangement of interconnected networks 150 including wired and/or wireless networks. By way of example, device 160 may communicate with a wireless network according to a wireless communication protocol such as AMPS, CDMA, TDMA, GSM, iDEN, GPRS, EDGE, UMTS, WCDMA, WLAN/WiFi, WiMax, BlueTooth, or their variants, among others. The wireless network may interface with a back-end network that includes proxy server 130 in communication with content server 110. The device 160-proxy server 130 communication path and the proxy server 130-content server 110 communication path may be secured according to any suitable protocol, such as Secure Socket Layer (SSL) protocol or Transport Layer Security (TLS) protocol. In some embodiments, proxy server 130 may verify that device 160 is communicating via secure client application 162. Proxy server 130 may deny requests for data that originate outside of secure client application 162.

At step 206, proxy server 130 receives an authentication request from device 160. In some embodiments, the authentication request may comprise login credentials supplied by a user of device 160. Device 160 may prompt the user to provide the login credentials at any suitable time, such as upon a determination that a maximum amount of time has elapsed since a previous authentication, in response to receiving an instruction from proxy server 130 instructing device 160 to assist in authentication, or when the user launches secure client application 162 (the application that allows the user to access data from content server 110 via proxy server 130). In some embodiments, the login credentials may include a user identifier and a passcode. Examples of user identifiers include a user name or user number. Examples of passcodes include a string of one or more letters, numbers, punctuation marks, or other characters, such as a password or PIN previously configured by the user, a string of characters generated by a token in the user's possession, biometric data, facial recognition, visual patterns, or a combination.

After receiving the authentication request, proxy server 130 determines whether the device successfully passes authentication at step 210. In some embodiments, proxy server 130 forwards the login credentials to content server 110, and content server 110 performs authentication. Accordingly, proxy server 130 determines whether or not authentication was successful based on the authentication response received from content server 110. In some alternative embodiments, proxy server 130 may perform the authentication itself. For example, proxy server 130 may determine that authentication passes if the login credentials received in the authentication request match the login credentials of an existing profile associated with the user.

If authentication fails, the method may return to step 206 to provide the user the opportunity to make a correction to the login credentials. In some embodiments, if the number authentication failures exceeds a threshold for maximum authentication attempts, device 160 may be locked out of the proxy server 130, content server 110, or both, and/or a system administrator may be notified. If authentication passes, the method proceeds to step 214 where proxy server 130 establishes a session with content server 110 on behalf of the user. In certain embodiments, establishing a session between content server 110 and proxy server 130 may optionally include authenticating proxy server 130 (in addition to authenticating the user of device 160).

At step 218, proxy server 130 retrieves emails (or portions of emails) that content server 110 associates with the user. Proxy server 130 may retrieve any suitable subset of emails, such as the n number of most recent emails, emails received within a recent timeframe (e.g., hour, day, week, month), the emails flagged as high priority, the unread emails, the emails that match the user's search criteria (e.g., by sender, keyword, etc.), or all of the user's emails. Proxy server 130 may retrieve the emails according to a push mode, a pull mode, or both. In the push mode, content server 110 may automatically push a new email (or a message waiting notification) to proxy server 130 in response to receiving an incoming email from a sender. In the pull mode, proxy server 130 periodically requests content server 110 to provide new emails (if any) and/or additional content associated with the emails that proxy server 130 already knows about.

The method proceeds to step 222 where proxy server 130 communicates preview information to device 160. In some embodiments, preview information and other data communicated to device 160 from proxy server 130 may be accessible to secure client application 162 (the business application) and may be inaccessible to other applications of device 160 (the personal applications). Secure client application 162 of device 160 displays the preview information to the user. The preview information provides a relatively small amount of data to allow the user to decide whether or not to view other portions of the email. As an example, the preview information may comprise the subject line, the timestamp, and/or the name of the sender. As another example, the preview information may comprise the filename of an email attachment. In some embodiments, the preview information may have a text format, such as JSON formatted text that can be viewed by a Rich Client or an HTML Client.

The user may select one of the emails to view based on the preview information. In response to the user selecting the email, secure client application 162 may generate a request to render the selected email. The request may be formatted according to the JSON protocol or other suitable protocol. Device 160 sends the request to render the email to proxy server 130, and proxy server 130 receives the request at step 226.

Upon receiving the request to render the email, proxy server 130 may retrieve the email from content server 110 or from cache 138 (if content server 110 previously provided the email to proxy server 130). Proxy server 130 may render the email by dividing it into portions and/or converting it to a displayable format. Proxy server 130 may divide the message into a plurality of rendered portions to facilitate transmitting the message to device 160 quickly. The message may be divided into any suitable number of portions (2, 3, 4, . . . n portions) depending on the format and nature of the data, the message size, the capabilities of secure client application 162, and so on. Each rendered portion may contain any suitable amount of data. In some embodiments, the amount of data per portion may be selected such that only the data that is immediately viewable to the user is sent to device 160 at one time. The data that is immediately viewable to the user may be determined based on the immediate display capabilities of the secure client application of device 160. That is, proxy server 130 may approximate the amount of data that secure client application 162 may display at one time to determine how much data to include in a particular portion.

In some embodiments, page breaks in the data may be used to determine where each rendered portion should begin and end. For example, one rendered portion may correspond to one, two, three, or more pages of the email body or attachments. Proxy server 130 may determine the location of page breaks based on page break identifiers located within the raw data. Proxy server 130 may also approximate the location of page breaks based on the amount of data that proxy sever 120 anticipates secure client application 162 is capable of displaying at a time (e.g., within one screen). The approximation may be based on screen-page size information provided by secure client application 162, or it may be based on a range of screen-page sizes typically used by device displays.

Converting data into a displayable format may allow the data to be displayed independently of the raw data-specific application. Examples of raw formats include email formats (e.g., MIME), word processing formats (e.g., DOC or PDF), presentation formats (e.g., PPT), and spreadsheet formats (e.g., XLS). Examples of rendered formats include text-representative formats, such as JSON, XML, etc., as well as bitmap formats, such as BMP, DIB, ILBM, PBM, XBM, WBMP, JPEG, TIFF, PNG, GIF, and so on. The bitmap image provides a visual appearance comparable to what the user would see if the raw data message were opened in its data-specific application (e.g., if the raw data includes formatted text and graphics, the bitmap image shows a snapshot of the formatted text and graphics rather than some combination of unformatted text, hyperlinks, truncated data, white space, or other placeholders that characterize conventional webmail viewed from a mobile phone).

At step 230, proxy server 130 communicates one or more rendered portions of the email to device 160. Secure client application 162 of device 160 displays the rendered portion to the user. Thus, if the rendered data is in bitmap format the user may view the content of the email without having the actual raw data format of the message stored on device 160. In some embodiments, proxy server 130 times the sending of the rendered portions dynamically so that the sequential rendered portions that make up a particular email arrive at device 160 as needed. Because the rendered portions may be kept relatively small, device 160 may receive and display each rendered portion relatively quickly. The user experience may be improved because the user can start viewing the beginning of the message without having to wait for the entire message to download. In addition, security may be increased because proxy server 130 need not send portions of the message to device 160 that the user does not wish to view. For example, after reading the rendered portions comprising the body of an email "A," a user may decide that it is unnecessary to view the attachments associated with email A. Accordingly, proxy server 130 need not send the attachments to device 160, so the risk of the attachments falling into the wrong hands is minimized.

In order to maintain the application speed experienced by the user, proxy server 130 may send a first rendered portion to device 160, anticipate when the user will want to view a second rendered portion, and communicate the second rendered portion to device 160 in advance so that the second rendered portion is available when the user wants it. Thus, the user experience may be comparable to viewing raw data stored locally on device 160 using a data-specific application. Accordingly, in some embodiments, proxy server 130 communicates a first rendered portion of the message to device 160 at step 230. As an example, first rendered portion may comprise the first two pages of an email attachment.

At step 234, proxy server 130 determines whether a trigger point was reached. As an example, proxy server 130 may determine that trigger point was reached if a certain amount of time has elapsed since sending the previous rendered portion or upon receiving a notification from device 160. In some embodiments, proxy server 130 communicates the location of the trigger point to secure client application 162 of device 160. The location of the trigger point may be communicated in any suitable manner. For example, the location may be embedded in the rendered portion or it may be communicated in a control message. Proxy server 130 instructs secure client application 162 to detect when the trigger point is reached and to notify proxy server 130 accordingly. Or, secure client application 162 may maintain a policy indicating when to notify proxy server 130 that a trigger point was reached. The trigger point may be positioned prior to the end of the first rendered portion. Continuing with the example above wherein the first rendered portion comprises the first two pages of an email attachment, the trigger point may correspond to the end of the first page. Thus, the trigger point would be reached when the user scrolls from the first page to the second page of the attachment. Upon determining that the trigger point was reached, the method proceeds to step 238.

At step 238, proxy server 130 communicates a second rendered portion of the message in response to determining that the trigger point of the first rendered portion was reached. Proxy server 130 and/or secure client application may anticipate the information that the user would like to view next in order to make the data available to the user in a timely fashion. The anticipated information may be included in the second rendered portion. For example, proxy server 130 and/or secure client application 162 may anticipate that the user would like to view information in sequence. Thus, after viewing the first and second pages of an email attachment, proxy server 130 and/or secure client application 162 may anticipate that the user would like to view the third and fourth pages of the email attachment. Accordingly, proxy server 130 may communicate the third and fourth pages in the second rendered portion so that the user may continue scrolling through the attachment without having to click "more" or "next page" and waiting for device 160 to download the next pages. That is, by anticipating the information that the user would like to view next, the information may be sent to device 160 in advance so that the user does not perceive delays in accessing the information.

For security purposes, certain embodiments may store the rendered portions in memory accessible to secure client application 162, but inaccessible to other applications of device 160. For security purposes, the rendered portions may be stored on device 160 temporarily such that the rendered portions associated with a particular email may be deleted from local memory of device 160 upon a determination that a completion event occurred. Thus, if device 160 later becomes lost or stolen, a third party may be prevented from accessing the email. The user may regain access to the email by passing authentication and re-requesting the email from proxy server 130.

At step 242, the method detects whether a completion event occurred. The completion event may be configured to predict when the user is likely finished viewing the email. Examples of completion events may include the user closing the email, the user moving to a different email, the user accessing an application external to secure client application 162, or determining that device 160 has been de-authenticated (e.g., if the user logs off or closes secure client application 162, if device 160 powers down, upon the expiration of an idle time or other session timer, or upon a determination that a communication link between proxy server 130 and device 160 has become disconnected or insufficiently secure). Upon determining that the completion event occurred, the method proceeds to step 246.

At step 246, device 160 deletes the rendered portion(s) from memory. For example, device 160 may delete rendered portions in response to an instruction from proxy server 130. Or, secure client application 162 may apply a policy that indicates the rules for deleting data. The rules may define the completion events, the duration of idle timer(s) or session timer(s), and so on. The policy may be pushed to secure client application 162 from proxy server 130, or the policy may be pre-configured as a part of secure client application 162.

In some embodiments, secure client application 162 may maintain the rendered portions corresponding to the most recently viewed email(s) in memory after a completion event occurs on the condition that the email(s) cannot be displayed to the user until security has been cleared (e.g., user must enter a PIN or re-authenticate to secure client application 162, proxy server 130, and/or content server 110).

After deleting the rendered portions at step 246, device 160 may no longer store a local copy of the email. However, content server 110 and/or proxy server 130 may maintain the email in raw form and/or rendered form after the rendered portions have been deleted from device 160. In other words, deleting the email from the device for security purposes is done independently of deleting the email from the mail server/proxy server. There may be circumstances in which device 160 deletes rendered portions for reasons other than security. For example, device 160 may delete rendered portions in response to a command from the user. In that case, device 160 may communicate an instruction to delete the corresponding email from proxy server 130 and content server 110. After deleting the rendered portions from device 160, the method then ends.

Although the preceding method has been described in the context of proxy server 130 retrieving data from content server 110 after the session with secure client application 162 is up and authenticated, in alternative embodiments proxy server 130 may obtain data from content server 110 during the times that secure client 162 is not connected/authenticated. For example, proxy server 130 may use OAuth (on behalf of authentication) or stored user credentials to obtain user data in advance. Data may be obtained according to a push mode, a pull mode, or a combination of modes. Proxy server 130 may cache the data to facilitate quick retrieval by secure client application 162 once secure client application 162 is connected and authenticated.

Figure 3:
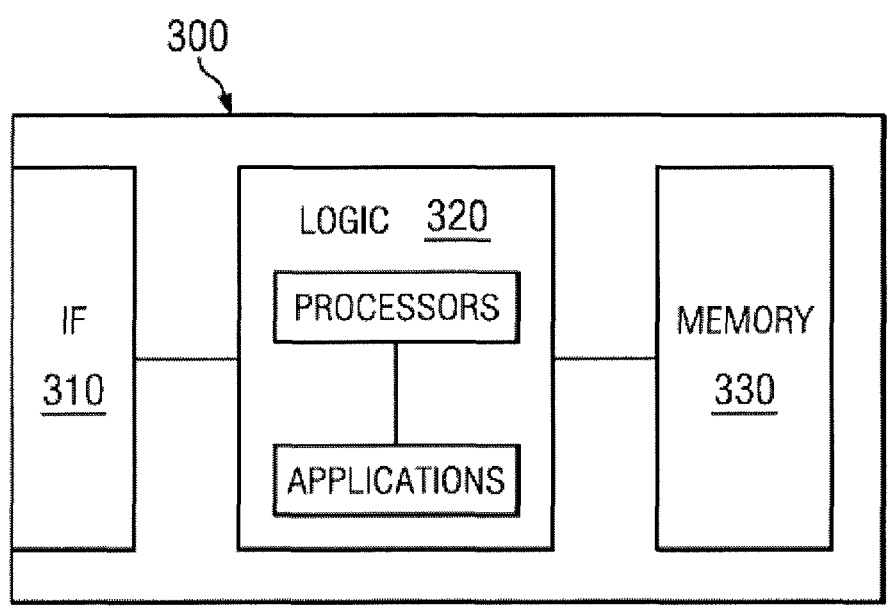
FIG. 3 illustrates examples of elements that may be included in the content server, proxy server, network, and/or devices described with respect to FIG. 1.

FIG. 3 illustrates an example of elements 300 that may be included in the systems and apparatuses disclosed herein. For example, any of content server 110, proxy server 130, network 150, and/or device 160 may include an interface 310, logic 320, memory 330, and/or other suitable element. Interface 310 receives input, sends output, processes the input and/or output, and/or performs other suitable operation. Interface 310 may comprise hardware and/or software.

Logic 320 performs the operations of the component, for example, executes instructions to generate output from input. Logic 320 may include hardware, software, and/or other logic. Logic 320 may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 330 (or memory unit) stores information. Memory 330 may comprise one or more non-transitory, tangible, computer-readable, and/or computer-executable storage media. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 4:
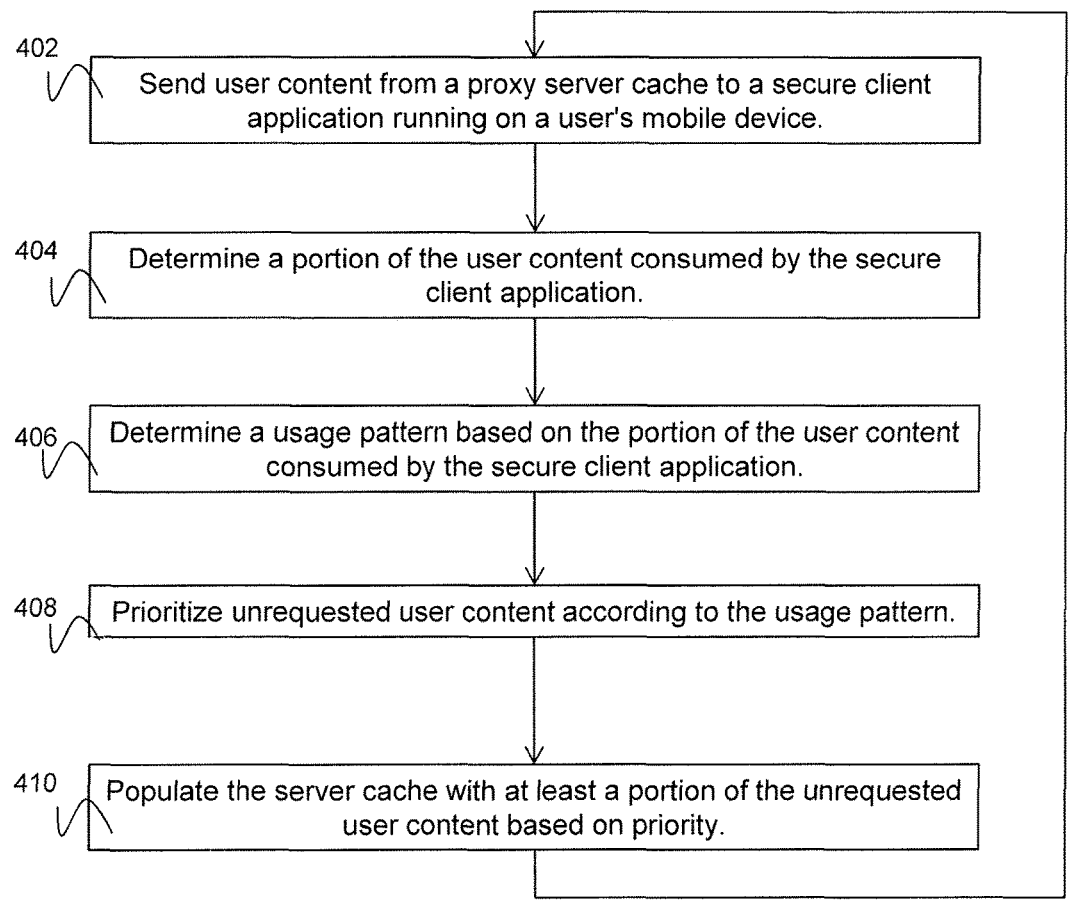
FIGS. 4 and 5A-5C illustrate examples of methods for preemptively populating a proxy server cache with protected user content for streaming to a user's mobile device.

FIG. 4 illustrates an example of a method in a proxy server 130 for populating a proxy server cache 138 with user content for delivery to a secure client application 162 running on a user's mobile device 160. The method begins at step 402 where proxy server 130 sends user content from proxy server cache 138 to secure client application 162 running on the user's mobile device 160. Proxy server 130 may push the user content from proxy server cache 138 to secure client application 162 or secure client application 162 may pull the user content from proxy server cache 138.

At step 404, proxy server 130 determines a portion of the user content that has been consumed by secure client application 162. In some embodiments, the user content may be considered to be consumed if secure client application 162 has presented the user content to the user. In some embodiments, the user content may be considered to be consumed if secure client application 162 is in the process of presenting the user content to the user, such as when the user has requested the user content and secure client application 162 is in the process of fulfilling the request. Proxy server 130 may determine the portion of user content that has been consumed based on feedback from secure client application 162.

At step 406, proxy server 130 determines a usage pattern based on the portion of the user content consumed by the secure client application. The usage pattern may indicate when the user transitions from consuming user content in one domain to consuming user content in another domain. The domain may have an associated category, such as email messages, calendar appointments, notes, and contact information categories. The domain may also have an associated format, such as a summary list format, a detail format, and an attachment format.

As an example, a summary format of email messages may list basic information for the email messages, such as sender, subject, date, size, importance, attachment indicator, or other summary information. A detail format of an email message may provide additional details, including the message body of the email. An attachment format of an email may open attachments to an email, such as word processing documents, spreadsheets, photographs, presentations, or other attachments. In some embodiments, the email message domain category may be sub-categorized according to a folder, such as an inbox folder, sent mail folder, deleted mail folder, junk mail folder, or a subfolder of any of these folders. The usage pattern may indicate the folder/subfolder that the user has been viewing and if the user transitions to a different folder/subfolder.

As another example, a summary format of calendar appointments may list basic information for the calendar appointment, such as date, time, and/or meeting name. A detail format of a calendar appointment may provide additional details, such as a list of persons participating in the appointment, scheduling information for the participants, an appointment location, and/or a message describing the appointment. An attachment format of a calendar appointment may open attachments to the appointment, such as word processing documents, spreadsheets, photographs, presentations, or other attachments that the participants plan to review during the appointment. In some embodiments, the calendar appointment domain category may be sub-categorized according to a time interval, such as a yearly, monthly, weekly, daily, or hourly time interval. The usage pattern may indicate the time interval that the user has been viewing and if the user transitions to a different time interval.

As another example, a summary format of notes may list basic information for the notes, such as a title. A detail format of a note may provide additional details, including the message body of the note. An attachment format of a note may open attachments to the note.

As yet another example, a summary format of contact information may provide a list of contact names. The list may include job titles, company names, phone numbers, email addresses, or other contact information. A detail format of contact information may provide a contact record for a particular contact. The contact record may include the summary information for the particular contact (such as name, job title, company, phone number, email address, etc.) and may optionally include additional information about the contact (such as alternate phone numbers, mailing addresses, and so on).

At step 408, proxy server 130 prioritizes unrequested user content according to the usage pattern. As an example, if the usage pattern indicates that the user recently scrolled through a summary list of emails from January followed by a summary list of emails from February, proxy server 130 may give high priority to a summary list of emails from March. Prioritizing the unrequested user content according to the usage pattern may allow proxy server 130 to anticipate the unrequested user content that the user is likely to request in the near term. Proxy server 130 may then populate proxy server cache 138 with at least a portion of the unrequested user content based on priority at step 410.

Anticipating the user content that the user is likely to request and populating that content in proxy server cache 138 may allow for a responsive user experience. For example, the user content may be cached and/or delivered to secure mobile application 162 before the user requests it. Having the user content ready before it is requested may mean that the user perceives the amount of time from a subsequent user request to delivery of the requested user content as short.

After populating proxy server cache 138 in step 410, the method may then repeat steps 402-410. Proxy server 130 sends the high priority user content from proxy server cache 138 at step 402, determines a portion of the user content that has been consumed at step 404, and updates the usage pattern at step 406. At step 408, proxy server 130 may then reprioritize the remaining unrequested user content based on the updated usage pattern.

Continuing with the previous example where the user scrolled through summary lists of email messages from January, February, and March. Suppose the updated usage pattern indicates that the user stopped scrolling through the summary list of emails and opened the details of a selected email. Proxy server 130 may give lower priority to the previous domain (the summary list format for the email category) and higher priority to the current domain (the detail format for the email category) or an anticipated next domain (the attachment format for the email category). As an example, proxy server 130 may give higher priority to detail and/or attachment formats of emails from a similar timeframe or related to a similar subject as the email that the user selected to open, and proxy server 130 may give lower priority to a summary list of email messages from April. Proxy server 130 may then populate proxy server cache 138 with unrequested user content based on the current priority.

As the user interacts with the user content, proxy server 130 may continue to repeat the steps in order to update the usage pattern and reprioritize the unrequested user content. In some embodiments, the method ends when the session ends, for example, due to inactivity or due to the user ending the session.

Figure 5A:
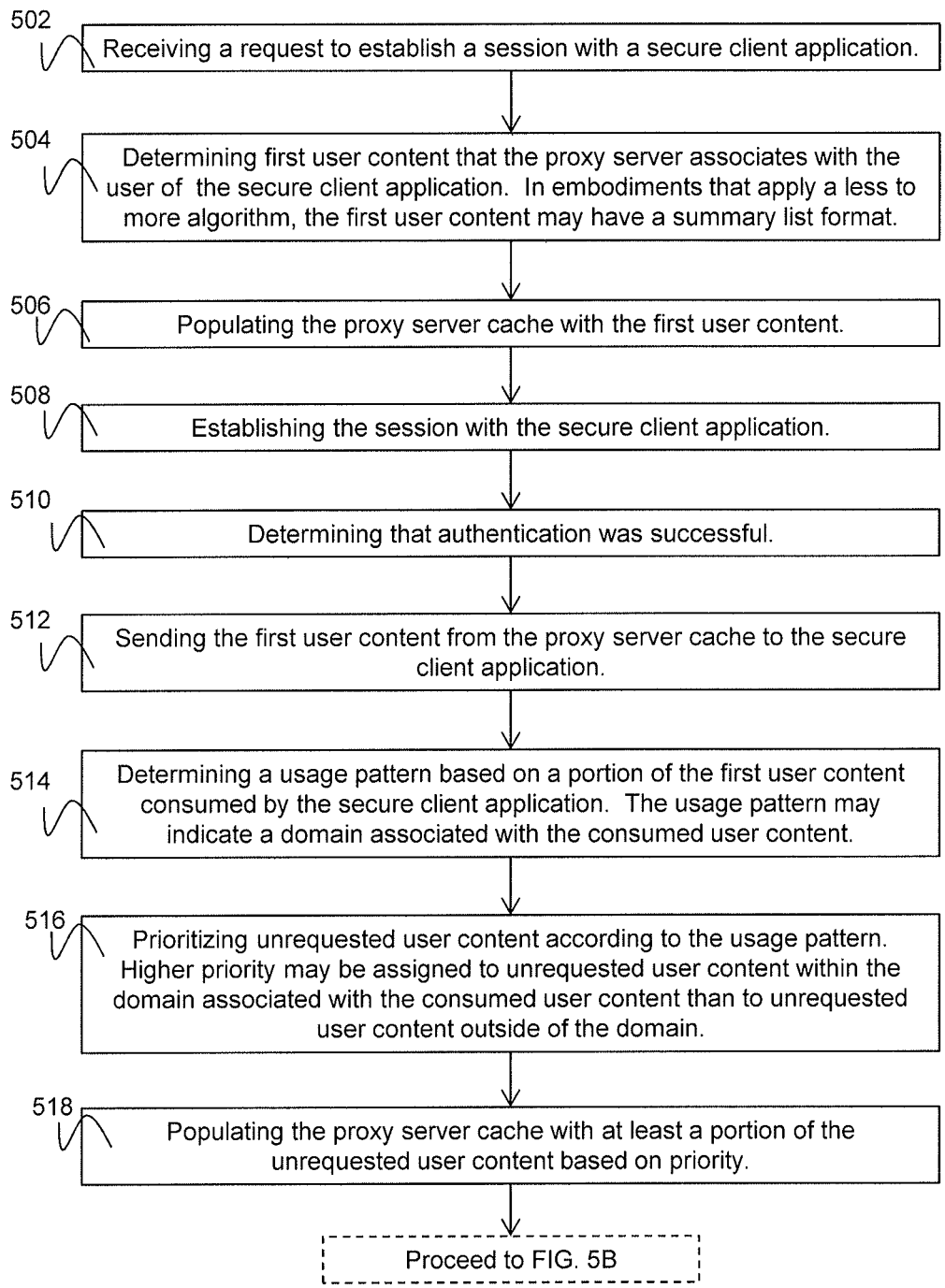
Figure 5B:
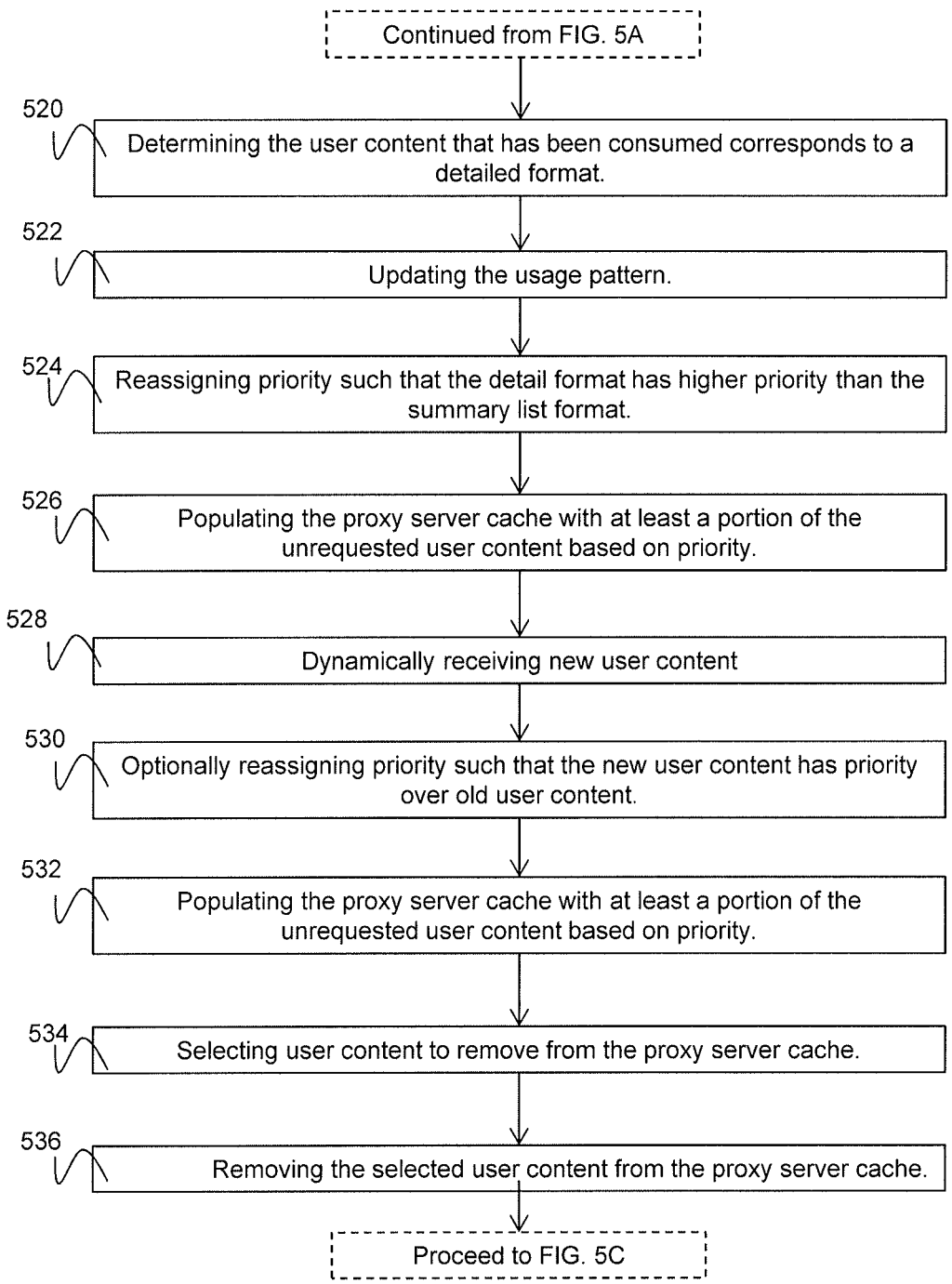
Figure 5C:
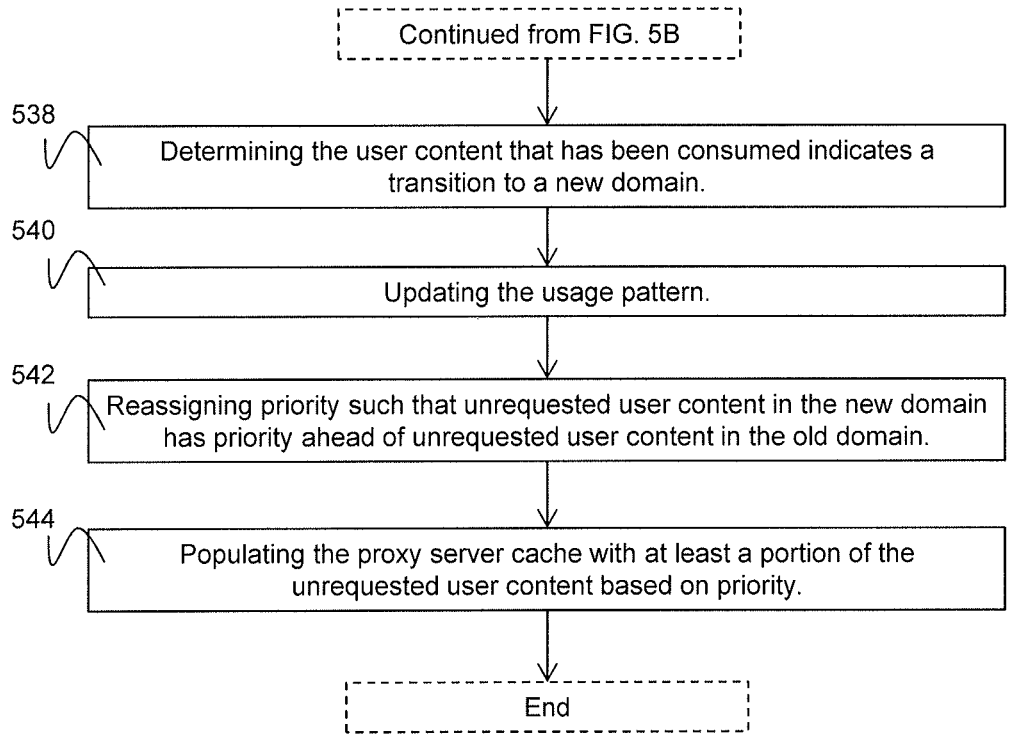

FIGS. 5A-5C illustrate a more detailed example of a method in a proxy server 130 for populating a proxy server cache 138 with user content for delivery to a secure client application 162 running on a user's mobile device 160. The method begins at step 502 of FIG. 5A where proxy server 130 receives a request to establish a session with secure client application 162. As an example, the request may be triggered by the user opening secure client application 162 on mobile device 160.

At step 504, proxy server 130 determines first user content that proxy server 130 associates with the user of secure client application 162. In embodiments that apply a less to more algorithm, proxy server 130 may select a summary list format for the first user content because a less to more strategy may initially assign higher priority to less detailed information (e.g., a summary list format) and may later assign higher priority to more detailed information (e.g., a detail format or an attachment format) as the user begins to drill down into the user content. The first user content may belong to a frequently used domain or a domain used during the user's last session with proxy server 130. As an example, the first user content may be a summary list of emails at the top of the user's inbox.

At step 506, proxy server 130 populates proxy server cache 138 with the first user content. In some embodiments, step 506 is performed as part of a pre-fetching procedure where the first user content is cached in response to receiving the request to establish the session at step 502 and independently of completing the establishment of the session (step 508 below) and determining that authentication was successful (step 510 below). This may allow proxy server 130 to begin populating an initial cache before the user enters login credentials into secure client application 162. The pre-fetching step may be optional and in other embodiments proxy server 130 may wait to populate proxy server cache 138 until after completing establishment of the session and determining that authentication was successful.

At step 508, proxy server 130 establishes the session with secure client application 162. In some embodiments, establishing the session may include setting up a path for communicating user content between proxy server 130 and secure client application 162. In some embodiments, establishing the session may include a message exchange where proxy server 130 and secure client application 162 negotiate configuration settings for security parameters or other session parameters.

At step 510, proxy server 130 determines that authentication was successful. In some embodiments, secure client application 162 running on mobile device 160 prompts the user to enter login credentials. Secure client application 162 may verify the login credentials and send an indication to proxy server 130 that authentication was successful. Secure client application 162 may send the indication explicitly (e.g., by sending a message that states authentication was successful) or implicitly (e.g., by requesting user content from proxy server 130). In another embodiment, secure client application 162 sends the login credentials to proxy server 130 and proxy server 130 authenticates the user by verifying the login credentials itself. In another embodiment, secure client application 162 sends the login credentials to content server 110, content server 110 verifies the login credentials, and content server 110 sends an indication to proxy server 130 that authentication was successful. Content server 110 may send the indication explicitly (e.g., by sending a message that states authentication was successful) or implicitly (e.g., by sending user content to proxy server 130).

After completing the establishment of the session and determining that authentication was successful, proxy server 130 may send the first user content from proxy server cache 138 to secure client application 162 at step 512. In another embodiment (not shown), proxy server 130 may send the first user content from proxy server cache 138 to secure client application 162 without proxy server 130 having to determine that the session was successfully authenticated. In the embodiment, secure client application 162 receives the first user content but waits until secure client application 162 has determined that authentication was successful before presenting the first user content to the user.

In some embodiments, proxy server 130 continually streams additional user content to secure client application 162 as the user content gets populated in proxy server cache 138. Steps 514-544 below describe examples of populating additional user content in proxy server cache 138.

At step 514, proxy server 130 determines a usage pattern based on a portion of the first user content consumed by the secure client application. The usage pattern may indicate a domain associated with the consumed user content. The domain may have an associated category, such as email messages, calendar appointments, notes, and contact information categories. The domain may have an associated subcategory, such as a folder/subfolder of an email mailbox or a time interval that indicates whether the user is viewing summary information for a calendar according to month, week, or day. The domain may also have an associated format, such as a summary list format, a detail format, and an attachment format.

At step 516, proxy server 130 prioritizes unrequested user content according to the usage pattern. Higher priority may be assigned to unrequested user content within the domain associated with the consumed user content than to unrequested user content outside of the domain. As an example, if the user has been requesting to view a summary list format of emails (such as a list of emails from January and February), proxy server 130 might give highest priority to a summary list format of unrequested emails (such as a list of emails from March) and second highest priority to a detail format of emails to anticipate less to more drilling down by the user. In the example, proxy server 130 might give lower priority to unrequested user content in other domains, such as calendar appointments and contact information.

In some embodiments, proxy server 130 may maintain consumed user content in proxy server cache 138. For example, if the user reads an email, proxy server 130 may maintain the read email in proxy server cache 138 in case the user decides to re-read the email. Proxy server may prioritize unconsumed user content (such as an unread email that the user is likely to request next) ahead of consumed user content (such as the email that the user just read). Additionally, proxy server 130 may prioritize requested user content over unrequested user content. Thus, if the user requests user content that proxy server 130 did not anticipate and therefore did not pre-populate into proxy server cache 138, proxy server 130 may respond to the request by populating the requested user content in proxy server cache 138 with high priority.

At step 518, proxy server 130 populates proxy server cache 138 with at least a portion of the unrequested user content based on priority. The amount of unrequested user content to populate in proxy server cache 138 may be determined based on any suitable factors, such as the current capacity of proxy server cache 138 and/or the anticipated needs of the user.

Continuing to FIG. 5B. At step 520, proxy server 130 determines that the user content that has been consumed corresponds to a detailed format. For example, the user may transition from scrolling through a list of emails to opening a particular email. At step 522, proxy server 130 updates the usage pattern to indicate the transition to the detailed format. At step 524, proxy server 130 reassigns priority such that the detail format has higher priority than the summary list format. At step 526, proxy server 130 populates proxy server cache 138 with at least a portion of the unrequested user content based on the reassigned priority. As an example, proxy server 130 may populate the full email messages of unrequested emails from a similar timeframe as the email that the user opened and/or unrequested emails having a similar subject as the email that the user opened.

At step 528, proxy server 130 dynamically receives new user content, such as a new incoming email to be delivered to the user (e.g., an email received via a push notification from mail server 112) or new user content that the user creates (e.g., an email that the user just sent or saved as a draft). At step 530, optionally reassigns priority such that the new user content has priority over old user content. For example, in some embodiments proxy server 130 manages handling dynamic data received via push notifications from content server 110/mail server 112 independently of populating proxy server cache 138. Thus, proxy server 130 may receive the dynamic data and may prioritize the dynamic data based on the domain that the user is currently working in.

As an example, if the user is currently viewing a summary list of emails when mail server 112 pushes a new email to proxy server 130, proxy server 130 may assign a high priority to the new email's summary list information. The user may choose to interact with the new email and, if so, proxy server 130's caching algorithm updates the usage pattern and reassigns priority to unrequested user content as it would in other scenarios. There may be situations in which proxy server 130 receives dynamic data for a domain that differs from the domain that the user is currently working in. As an example, if the user is currently viewing attachments of a particular email when mail server 112 pushes a new email to proxy server 130, proxy server 130 may prioritize the next attachment of the email that the user is currently viewing ahead of summary list information associated with the new incoming email.

At step 532, proxy server 130 populates proxy server cache 138 with at least a portion of the unrequested user content based on the reassigned priority. Thus, as an example, if proxy server 130 anticipates that the user is more likely to request to view a new email over an email received last week, proxy server 130 populates proxy server cache 138 accordingly.

Proxy server 130 may periodically monitor proxy server performance metrics and may use the proxy server performance metrics determine whether to remove user content from proxy server cache 138. Examples of proxy server performance metrics include server load, server memory, utilization of data, and time of availability. If the proxy server performance metrics indicate to remove user content from proxy server cache 138, for example, due to low resource availability, at step 534 proxy server selects user content to remove from proxy server cache 138. The user content may be selected for removal based on the proxy server performance metrics. For example, the proxy server performance metrics may indicate the amount of user content that needs to be removed from proxy server cache 138 in order to optimize the performance of proxy server 130. The user content may also be selected for removal based on the usage pattern. For example, lower priority user content that proxy server 130 anticipates the user is less likely to request in the near term can be removed first. At step 536, proxy server 130 removes the selected user content from proxy server cache 138.

Continuing to FIG. 5C. At step 538, proxy server 130 determines that the user content that has been consumed indicates a transition to a new domain. As an example, the user may transition from viewing email messages to viewing calendar appointments. At step 540, proxy server 130 updates the usage pattern. At step 542, proxy server 130 reassigns priority such that unrequested user content in the new domain has priority ahead of unrequested user content in the old domain. In the example, calendar appointments may be given higher priority than emails. At step 544, proxy server populates proxy server cache 138 with at least a portion of the unrequested user content based on the reassigned priority.

As the user interacts with the user content, proxy server 130 may continue to perform steps analogous to those described above in order to update the usage pattern and reprioritize the unrequested user content. In some embodiments, the method ends when the session ends, for example, due to inactivity or due to the user ending the session.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. As an example, determinations whether to delete data from secure client application 162 may be made by proxy server 130, by secure client application 162, or both. As another example, a generic user interface may be provided by proxy server 130 (e.g., in the case of a Thin Client) or by secure client application 162 (e.g., in the case of a Rich Client). As another example, raw data may be rendered by proxy server 130, or portions of the raw data may be sent to secure client application 162 (e.g., in certain embodiments of the Rich Client) to be processed and displayed securely within secure client application 162. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order. For example, the methods may authenticate more, fewer, or other authentication factors, and the authentication factors may be verified in any suitable order. Authentication may be performed between any suitable components. For example, content server 110 may authenticate proxy server 130, device 160, and/or the user of device 160. Proxy server 130 may optionally authenticate device 160, client application 162, and/or the user of device 160. Alternatively, proxy server 130 may defer to content server 110 and/or secure client application 162 to authenticate the user. Secure client application 162 may authenticate the user locally.

Some embodiments of the disclosure may provide one or more technical advantages. A technical advantage of some embodiments may be that a security system comprising a remote server and a secure client application executed on the user's mobile device determines what user content to communicate to a user's mobile device, how much user content to communicate to the device, and when to delete the user content from the device. Thus, security over the user content may be effected by the security system without relying on the user of the device to secure the user content. As an example, the security system may enforce security policies configured to allow certain user content to be temporarily displayed to the user (e.g., when the user is authenticated and actively using the data) and then deleted from the device (e.g., when the user is de-authenticated or not actively using the data). Because security does not depend on the user, it may be possible to minimize the local restrictions or controls that the user's business might otherwise place on the user's mobile device. For example, the business may do away with restrictions on the type/brand/model of device the user may use. Accordingly, the user may select the mobile device that meets the user's personal needs, even if the device has relatively few security features installed/activated locally. As an example, the device need not have the capability to wipe its entire memory (personal data and user content) in the event that it becomes lost or stolen. As another example, the device need not have large amounts of local memory reserved exclusively for secured user content.

Another technical advantage of some embodiments may be that the security of user content may be increased by making it available to minimal resources of the device. For example, in some embodiments, the user content may be available to only a secure client application, such as a browser on the device. The secure client application may be configured to prevent the user content from being copied into other applications or memory of the device. With the user content secured, the business need not monitor or restrict the personal data stored elsewhere on the device. Accordingly, the user may download whatever personal apps that the user would like to download.

Another technical advantage of some embodiments may be that data communicated to the device from a remote server may have a look and feel comparable to data stored locally on the device and executed by a data-specific application installed on the device. In some embodiments, the server may render the raw data on behalf of the device and communicate the rendered data in an image format. The image format may be viewed using minimal resources of the device and without requiring the device to install/run the data-specific application.

To minimize both the security risks and the amount of local device resources required to support the user content, the amount of data communicated to the device at any given time may be no more than what is needed to support the user's current activities and anticipated activities. For example, the pages of a document may be communicated one page at a time. To maintain the user experience, in certain embodiments the server may anticipate the next piece of data that the user would likely want to see (e.g., the next page of the document) and may render and send the next piece of data to the device in advance. Thus, the user may continue to flip through the pages of the document without noticeable delays and without having to send follow-up requests to the server requesting the next page of the document. Previously provided pages of the document may be left on the device as long as the user is viewing the document to allow the user to scroll backwards in the document and re-read an earlier page.

Another technical advantage of some embodiments is that a "push" model of email delivery may be emulated without having to send the raw data mail message for storage on the device. The push model of email delivery automatically alerts the user of an incoming email in response to receiving the email from a sender (without the user having to periodically request whether or not a new email was received). In some embodiments, the server may push a message waiting alert or a preview of the email to the device. The user may request to view the email corresponding to the alert/preview, and the server may provide a rendered version of the email to the device if the security policy has been met (e.g., if the user has been authenticated).

Another technical advantage may be that a proxy server communicates policies to a secure client application. The policies contain rules that facilitate securing data. For example, a rule may indicate that secure client application may or may not access certain types of data based on its current GPS location. Another rule may indicate authentication requirements, such as the type(s) of authentication to be performed and how frequently to perform each type of authentication. Another rule may indicate completion events, such as navigating to a different file, accessing applications outside of the secure client application, expiration of a timer (and the duration setting of that timer), etc. Another rule may indicate how to determine whether a trigger point was reached in a file (e.g., based on page breaks in the data, the amount of data, or other criteria).

A technical advantage of certain embodiments includes providing a predictive and always up to date cache for a user's email data including: email summary, email detail, email attachment details, calendar, contacts and notes. The proxy server cache works in conjunction with a backend email system providing the underlying data store. Further communication from the backend data store to the proxy server is leveraged to provide a Publish Subscribe model to the proxy server so that its data can be kept in sync with the backing data store. As a user starts to interact with their mobile application, a notification is made from the client to the proxy server so that the proxy server cache is loaded and/or refreshed. This process may trigger the initial loading of the proxy server cache using a "less to more" strategy. In some embodiments, this happens prior to the user actually accessing any user content via the secure client application. As part of this handshake, the proxy server may establish a proxy server cache if one does not already exist and/or refresh the proxy server cache should one already exist. As the user begins to navigate within the application and to interact with domains in the application, the proxy server's caching algorithm evolves to better accommodate the domains anticipated as next to be loaded by the end user.

The predictive loading of the proxy server cache may be done by making assumptions about the nature of the user's interaction with the data. One example is that users view the summary of an email prior to looking at the detail of said message. As such, the summary may be loaded to the proxy server cache prior to loading the detail. As the user drills down, more details are loaded to the proxy server cache. If the user drills down further, even more details are loaded to the proxy server cache. If an email contains attachments, these attachments can be converted in a way that optimizes streaming to the device. For example, certain embodiments transcode sound files to a less bandwidth intensive format and break up multi-page documents into individual streamed pages. As the user delves into certain domains (contacts, calendar, etc.) the proxy server's cache may be populated accordingly.

Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A proxy server, comprising:
one or more processors configured to execute logic encoded in a non-transitory computer-readable medium, whereby the proxy server is operable to:
populate a proxy server cache with first user content;
send the first user content to a secure client application executing on a user's mobile device, wherein the secure client application provides a secure environment for user content;
determine a usage pattern based on a portion of the first user content consumed by the secure client application, wherein the usage pattern indicates that the first user content comprises a summary format;
prioritize unrequested user content according to the usage pattern such that the summary format has higher priority than a detailed format;

populate the proxy server cache with at least a portion of the unrequested user content based on priority;
determine a transition to a new usage pattern in which the user content consumed by the secure client application comprises the detailed format; and
prioritize unrequested user content according to the new usage pattern such that the detailed format has higher priority than the summary format.

2. The proxy server of claim 1, wherein the usage pattern indicates a domain associated with the consumed user content and the proxy server assigns higher priority to unrequested user content within the domain than to unrequested user content outside of the domain.

3. The proxy server of claim 2, further configured to:
determine that the usage pattern indicates a transition to a new domain; and
assign higher priority to unrequested user content within the new domain than to unrequested user content within the old domain.

4. The proxy server of claim 2, wherein the domain comprises a format selected from the group consisting of the summary format, the detailed format, and an attachment format.

5. The proxy server of claim 4, wherein the domain further comprises a category selected from the group consisting of email messages, calendar appointments, notes, and contact information.

6. The proxy server of claim 1, wherein, based on a less to more algorithm, the proxy server is operable to initially assign the summary format higher priority than the detailed format.

7. The proxy server of claim 1, further configured to prioritize unconsumed user content ahead of consumed user content.

8. The proxy server of claim 1, further configured to dynamically receive new user content and prioritize the new user content over old user content.

9. The proxy server of claim 1, further configured to:
select user content to remove from the proxy server cache based on the usage pattern and proxy server performance metrics, the proxy server performance metrics indicating at least one of: server load, server memory, utilization of data, and time of availability; and
remove the selected user content from the proxy server cache.

10. The proxy server of claim 1, wherein the proxy server is configured to populate the proxy server cache with the first user content:
in response to receiving a request from the secure client application, the request requesting to establish a session; and
independently of completing the establishment of the session and determining that authentication was successful.

11. The proxy server of claim 10, wherein the proxy server is configured to send the first user content after completing the establishment of the session and determining that authentication was successful.

12. The proxy server of claim 1, wherein the proxy server cache is stored in memory without persisting any user content to disk.

13. The proxy server of claim 1, further configured to:
receive feedback from the secure client application; and
update the usage pattern based on the feedback.

14. The proxy server of claim 1, wherein the summary format comprises a list of email messages, a list of calendar appointments, or a list of contact names.

15. A method in a proxy server for populating a proxy server cache with user content, the method comprising:
populating the proxy server cache with first user content for delivery to a secure client application executing on a user's mobile device, wherein the secure client application provides a secure environment for user content;
sending the first user content to the secure client application;
determining a usage pattern based on a portion of the first user content consumed by the secure client application, wherein the usage pattern indicates that the first user content comprises a summary format;
prioritizing unrequested user content according to the usage pattern such that the summary format has higher priority than a detailed format;
populating the proxy server cache with at least a portion of the unrequested user content based on priority;
determining a transition to a new usage pattern in which the user content consumed by the secure client application comprises the detailed format; and
prioritizing unrequested user content according to the new usage pattern such that the detailed format has higher priority than the summary format.

16. The method of claim 15, wherein the usage pattern indicates a domain associated with the consumed user content and prioritizing unrequested user content according to the usage pattern comprises assigning higher priority to unrequested user content within the domain than to unrequested user content outside of the domain.

17. The method of claim 16, further comprising determining that the usage pattern indicates a transition to a new domain and prioritizing unrequested user content according to the usage pattern comprises assigning higher priority to unrequested user content within the new domain than to unrequested user content within the old domain.

18. The method of claim 16, wherein the domain comprises a format selected from the group consisting of the summary format, the detailed format, and an attachment format.

19. The method of claim 18, wherein the domain further comprises a category selected from the group consisting of email messages, calendar appointments, notes, and contact information.

20. The method of claim 15, wherein, based on a less to more algorithm, the method initially assigns the summary format higher priority than the detailed format.

21. The method of claim 15, further comprising configuring the proxy server cache to prioritize unconsumed user content ahead of consumed user content.

22. The method of claim 15, further comprising dynamically receiving new user content and prioritizing the new user content over old user content.

23. The method of claim 15, further comprising:
selecting user content to remove from the proxy server cache based on the usage pattern and proxy server performance metrics, the proxy server performance metrics indicating at least one of: server load, server memory, utilization of data, and time of availability; and
removing the selected user content from the proxy server cache.

24. The method of claim 15, wherein the method performs the populating of the proxy server cache with the first user content in response to receiving a request to establish a session and independently of completing the establishment of the session and determining that authentication was successful.

25. The method of claim 24, wherein the method performs the sending of the first user content after completing the establishment of the session and determining that authentication was successful.

26. The method of claim 15, wherein the proxy server cache is stored in memory without persisting any user content to disk.

27. The method of claim 15, further comprising:

receiving feedback from the secure client application; and updating the usage pattern based on the feedback.

28. A proxy server, comprising:

one or more processors configured to execute logic encoded in a non-transitory computer-readable medium, whereby the proxy server is operable to:

populate a proxy server cache with first user content, the first user content determined based on a less to more algorithm;

send the first user content to a secure client application executing on a user's mobile device, wherein the secure client application provides a secure environment for user content;

determine a usage pattern based on a portion of the first user content consumed by the secure client application, wherein the usage pattern indicates that the first user content comprises a summary format;

prioritize unrequested user content according to the usage pattern such that the summary format has higher priority than a detailed format;

populate the proxy server cache with at least a portion of the unrequested user content based on priority;

determine a transition to a new usage pattern in which the user content consumed by the secure client application comprises the detailed format; and prioritize unrequested user content according to the new usage pattern such that the detailed format has higher priority than the summary format.

* * * * *